US009068861B2

(12) United States Patent
O'Neil

(10) Patent No.: US 9,068,861 B2
(45) Date of Patent: Jun. 30, 2015

(54) RESOLVER INTERFACE

(75) Inventor: John M. O'Neil, Litchfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 294 days.

(21) Appl. No.: 13/594,408

(22) Filed: Aug. 24, 2012

(65) Prior Publication Data
US 2014/0055129 A1   Feb. 27, 2014

(51) Int. Cl.
G01B 7/14   (2006.01)
G01D 5/20   (2006.01)
G01D 5/22   (2006.01)

(52) U.S. Cl.
CPC ............ *G01D 5/2073* (2013.01); *G01D 5/2291* (2013.01)

(58) Field of Classification Search
CPC . G01D 5/2053; G01D 5/244; G01D 5/24476; G01D 5/24404; G01D 5/24461; G01D 5/208; G01D 5/12; G01D 5/2046; G01D 5/2086; G01D 5/145; G01D 5/2451; B60L 13/06; B60L 2200/26; G07B 7/003; G01R 31/42; G01R 31/31922; G01P 3/42; G01P 3/489; G01P 3/487; H03M 1/645; H03M 1/0617
USPC ............ 324/207.11–207.17, 207.23, 207.25, 324/86, 108, 256, 257–259, 683, 76.51, 324/76.77; 318/605, 632, 661, 660, 439, 318/254, 138
See application file for complete search history.

(56) References Cited

U.S. PATENT DOCUMENTS

| | | | | |
|---|---|---|---|---|
| 2,999,938 A | * | 9/1961 | Hann et al. | 250/202 |
| 4,594,540 A | * | 6/1986 | Currie et al. | 318/661 |
| 4,651,130 A | * | 3/1987 | Pennell | 341/116 |
| 5,196,776 A | * | 3/1993 | Shipley | 318/660 |
| 5,260,650 A | * | 11/1993 | Schwesig et al. | 324/163 |
| 5,455,498 A | * | 10/1995 | Kakimoto et al. | 318/605 |

(Continued)

FOREIGN PATENT DOCUMENTS

EP   2177879 A2   4/2010

OTHER PUBLICATIONS

Martin Staebler, TMS320F240 DSP Solution for Obtaining Resolver Angular Position and Speed, Texas Instruments, Application Report, SPRA605—Feb. 200.

(Continued)

*Primary Examiner* — Huy Q Phan
*Assistant Examiner* — Thang Le
(74) *Attorney, Agent, or Firm* — Kinney & Lange, P.A.

(57) ABSTRACT

A resolver interface includes an excitation coil, a first secondary coil, a second secondary coil, a sampling circuit, and a controller. The excitation coil receives an excitation signal that generates first and second signals in the first secondary coil and the second secondary coil, respectively. The sampling circuit includes a multiplexer that samples at least one period of the excitation signal, the first signal, and the second signal, individually. The controller is configured to calculate a sign of the first signal and the second signal relative to the excitation signal, wherein based on the calculated sign of the first signal and the second signal the controller determines a quadrant of the excitation coil and based on the determined quadrant and magnitudes of the sampled first signal and second signal calculates a position of the excitation coil.

7 Claims, 4 Drawing Sheets

(56) References Cited

U.S. PATENT DOCUMENTS

| | | | | |
|---|---|---|---|---|
| 6,331,759 | B1* | 12/2001 | Atmur | 318/661 |
| 7,015,840 | B2* | 3/2006 | Takehara | 341/116 |
| 7,047,145 | B2* | 5/2006 | Ishizuka et al. | 702/94 |
| 8,078,425 | B2* | 12/2011 | Bernard et al. | 702/151 |
| 2002/0173931 | A1* | 11/2002 | Dudler et al. | 702/151 |
| 2010/0097052 | A1* | 4/2010 | Lillestolen et al. | 324/207.25 |

OTHER PUBLICATIONS

Andrzej Lara, Using the Resolver Interface eTPU Function, Freescale Semiconductor, Application Note, Document No. An3943, Rev. 0, Oct. 2009.

The European Search Report mail Jan. 21, 2014 for European Application No. 13179620.3.

* cited by examiner

RESOLVER INTERFACE

BACKGROUND

The present invention is related to resolvers, and in particular to resolvers employing multiplexed signal sampling.

Resolvers are used in a variety of applications to provide position feedback. For example, resolvers are oftentimes associated with actuators to provide feedback regarding the state of the actuator (e.g., open, partially open, closed). A typical resolver includes an excitation coil and first and second secondary coils positioned 90° out of phase with one another. An excitation signal supplied to the excitation coil generates corresponding output signals in the first and second secondary coils. By comparing the phase of the excitation signal to the phase of the output signals, the orientation or position of the excitation coil can be determined.

Typically, a resolver monitors the excitation signal and the corresponding output signals simultaneously to determine position. However, in some applications, a multiplexer is used to sample the respective signals successively as opposed to simultaneously. For these applications, the resolver position is only determinable within a 90° range. If the resolver position rotates more than 90°, the position cannot be determined without knowledge of the quadrant in which the position is located. For example, a first quadrant may represent angles from 0-90°, the second quadrant represents angles from 90-180°, the third quadrant represents angles from 180-270°, and the third quadrant represents angles from 270-360°. In these applications, the magnitude alone is insufficient to determine position.

SUMMARY

A resolver interface includes an excitation coil, a first secondary coil, a second secondary coil, a sampling circuit, and a controller. The excitation coil receives an excitation signal that generates first and second signals in the first secondary coil and the second secondary coil, respectively. The sampling circuit includes a multiplexer that samples at least one period of the excitation signal, the first signal, and the second signal, individually. The controller is configured to calculate a sign of the first signal and the second signal relative to the excitation signal, wherein based on the calculated sign of the first signal and the second signal the controller determines a quadrant of the excitation coil and based on the determined quadrant and magnitudes of the sampled first signal and second signal calculates a position of the excitation coil.

DETAILED DESCRIPTION

Figure 1:
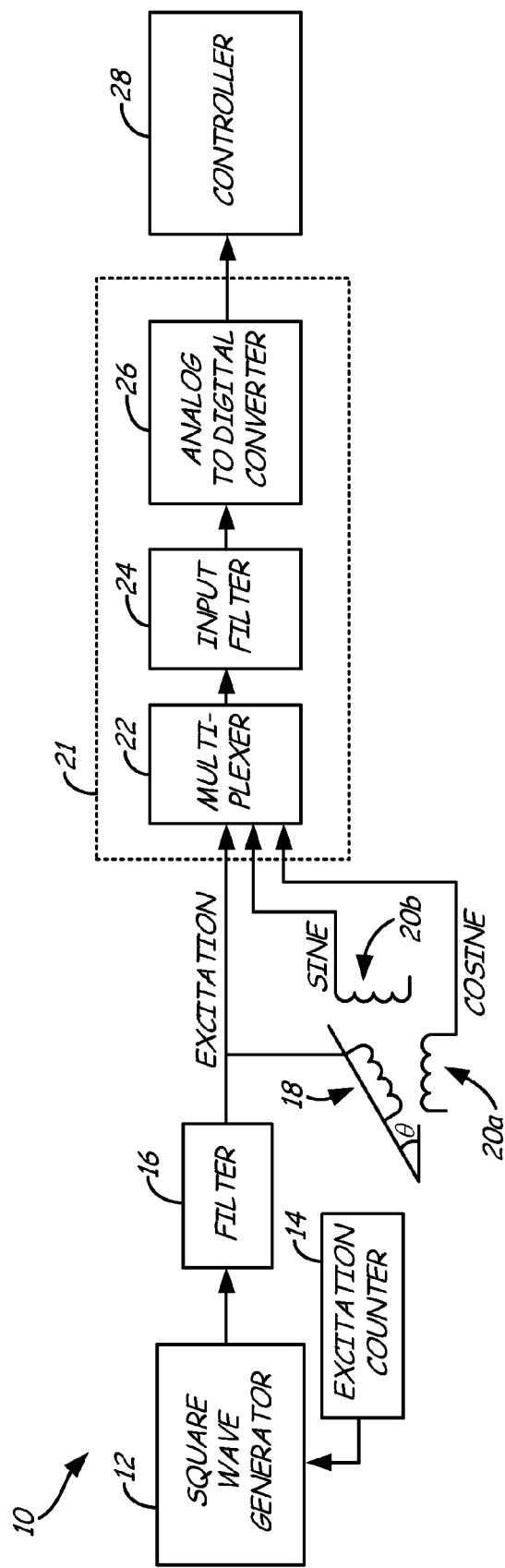
FIG. 1 is a block diagram of a resolver interface according to an embodiment of the present invention.

FIG. 1 is a block diagram of resolver interface 10 according to an embodiment of the present invention. Resolver interface 10 includes square wave generator 12, excitation counter 14, filter 16, excitation coil 18, secondary coils 20a, 20b, and sample circuit 21, which includes multiplexer 22, input filter 24, and analog-digital converter 26. Controller 28 determines a position of the resolver (i.e., of excitation coil 18) based on the magnitude and sign of the monitored signals as provided by A/D converter 26.

Square wave generator 12 generates a square wave signal having a defined frequency based on the count provided by excitation counter 14. Filter 16 shapes the square wave signal into a sine wave excitation signal having a frequency equal to that defined by excitation counter 14.

The sine wave excitation signal is supplied to excitation coil 18, and monitored by multiplexer 22. The excitation signal provided to excitation coil 18 results in the generation of secondary signals (labeled "COSINE" and "SINE" because of the 90° phase shift between them) in secondary coils 20a and 20b, respectively. The position of exciter coil 18 is expressed as an angle θ relative to secondary coil 20a. The magnitude of the secondary signals COSINE and SINE generated in secondary coils 20a and 20b, respectively, depend on the angle θ. In addition, because excitation coil 18 rotates more than 90°, determining the position of excitation coil 18 depends on the phase or "sign" of the secondary signals in relation to the excitation signal.

Multiplexer 22 samples the excitation signal and the secondary signals COSINE and SINE generated in secondary coils 20a and 20b, and provides a multiplexed output to filter 24. The filtered output is provided to A/D converter 26, which converts the analog samples to digital signals that indicate the magnitude and sign of the monitored excitation signal and secondary signals COSINE and SINE. Based on these inputs, controller 28 determines the position θ of excitation coil 18.

Because the signals are not monitored simultaneously, the phase relationship between the excitation signals and secondary signals is not known based on a simple comparison. Therefore, additional steps are taken to determine the sign of both the secondary signals SINE and COSINE, which in turn indicates the quadrant in which the position angle resides. Described in more detail with respect to the flowchart shown in FIG. 2, controller 28 samples the excitation counter used to generate the square wave signal and determines the excitation phase delay between the start of the square wave signal (e.g., counter equal to zero) and the peak of the monitored excitation signal. Based on that information, controller 28 can determine the corresponding peak of both the monitored SINE and COSINE signals. To determine whether the corresponding peak is negative or positive, controller 28 compares the peak with samples 180° out of phase with the peak. If the sampled peak is greater than the out of phase samples, then the sign or phase of the monitored signal is positive. If the sampled peak is less than the out of phase samples, then the sign or phase of the monitored signal is negative. Based on the determined sign of the SINE and COSINE signal, the position quadrant (e.g., 0-90°, 90-180°, 180-270°, 270-360°) can be determined. Then, based on the determined quadrant and magnitude of the monitored signals, controller 28 determines the position θ of the resolver.

A benefit of the present invention, is all signals are provided through the same sampling circuit hardware (e.g., multiplexer 22, input filter 24, and analog-digital converter 26). In this way, a bias that may otherwise be introduced by sampling all three signals simultaneously via different hardware elements is remedied by applying all sampled signals through the same hardware configuration.

Figure 2:
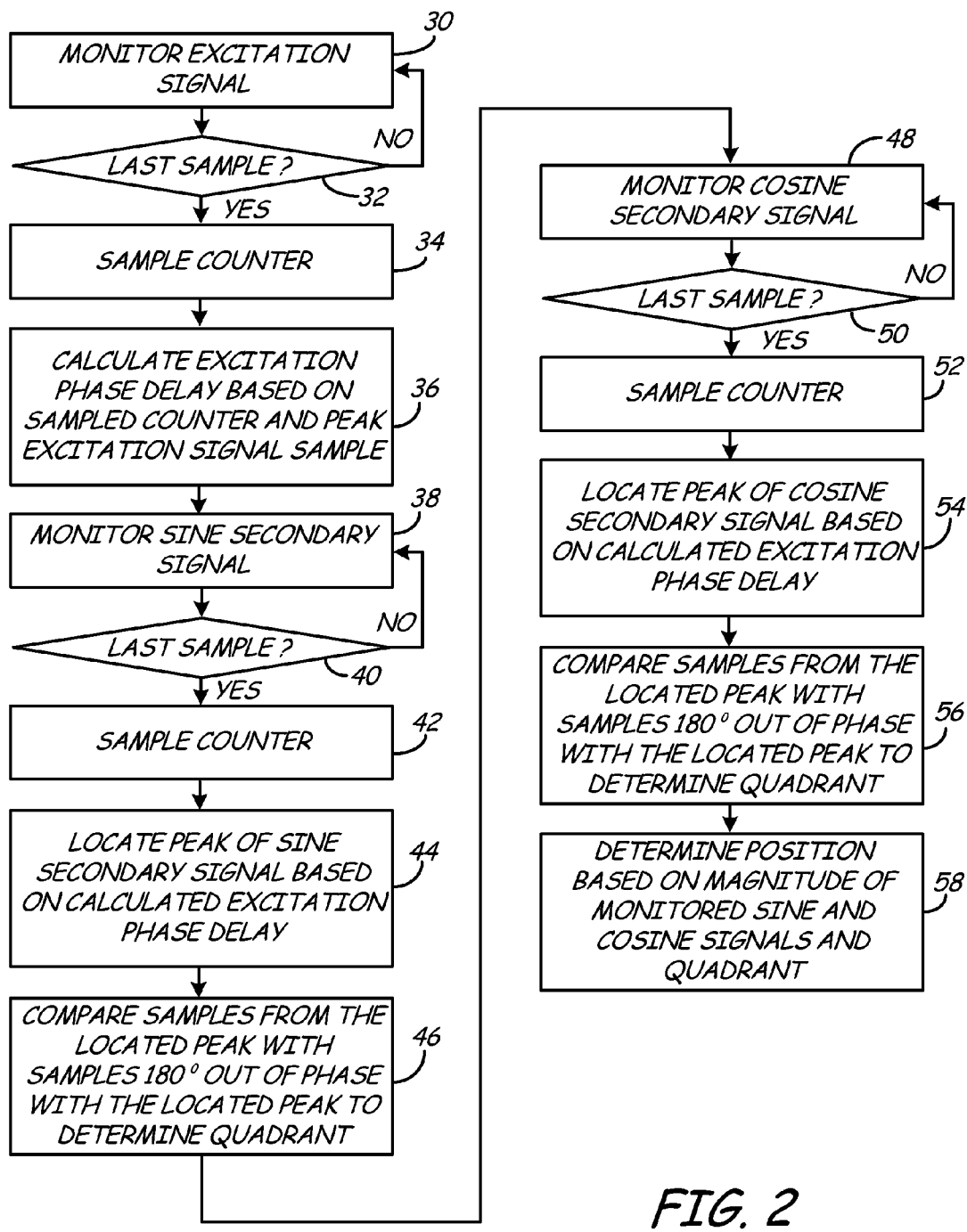
FIG. 2 is a flowchart illustrating quadrant calculation according to an embodiment of the present invention.

FIG. 2 is a flowchart illustrating quadrant calculation performed by controller 28 according to an embodiment of the present invention. FIG. 2 is discussed with reference to FIGS.

3 and 4, which illustrate graphically the sampling of the excitation signal and secondary signals, respectively, along with illustrating calculations performed by controller 28.

Figure 3:
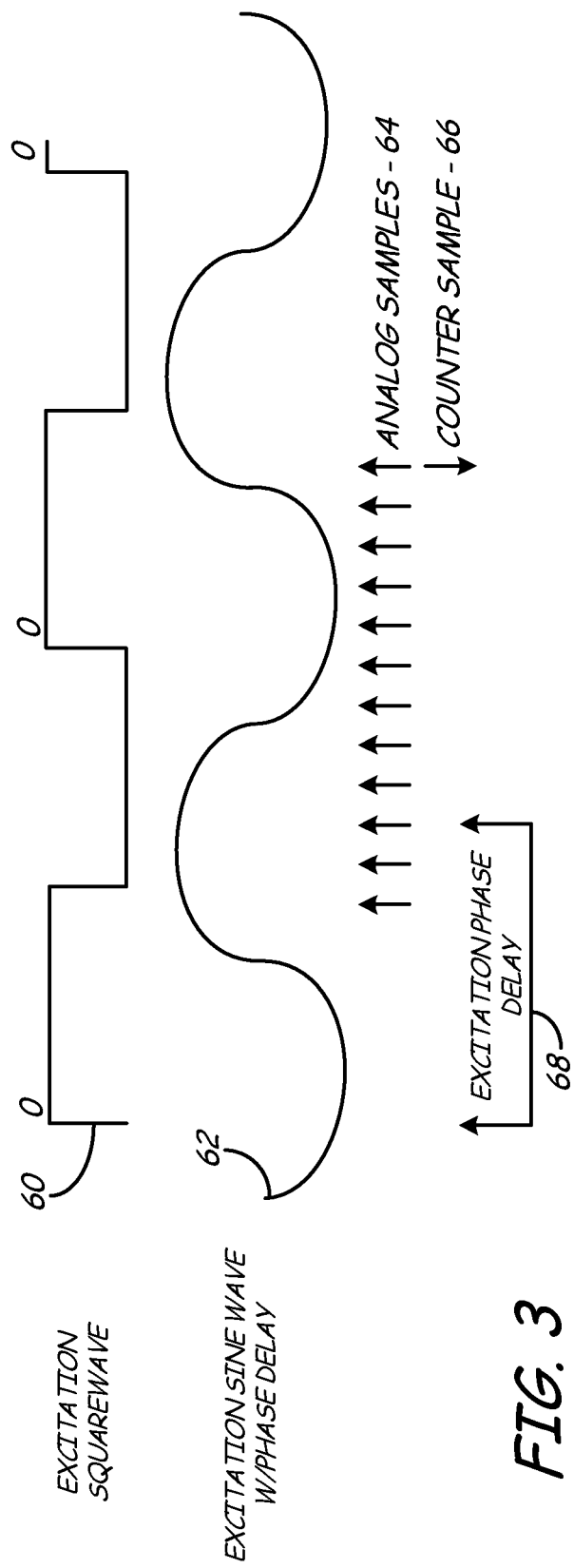
FIG. 3 is a waveform diagram that illustrates calculation of the excitation phase delay according to an embodiment of the present invention.

Steps 30 through 36 are described with reference to FIG. 3, which illustrates square wave signal 60, excitation signal 62, and analog samples 64 of the excitation signal. As discussed above, square wave signal 60 is generated by square wave generator 14 (shown in FIG. 1), and converted to a sine wave signal 62 by filter 16 (also shown in FIG. 1).

At step 30, excitation sine wave signal 62 is sampled by sample circuit 21, which includes multiplexer 22, input filter 24 and A/D converter 26 (as shown in FIG. 1). In one embodiment, the excitation signal is monitored for an entire period although other sampling periods may be utilized. Based on the sampling rate and fundamental frequency of the excitation square wave, the number of samples per period is known. In the embodiment shown in FIG. 3, twelve samples are taken by period of the excitation signal. At step 32, controller 28 determines whether the last sample of the period has been recorded. If not, then sampling continues at step 30. If the last sample has been sampled, then at step 34 the excitation counter 14 is sampled. The counter sample represents the count the square wave generator uses to generate the excitation square wave, and can be used to determine the start of the square wave signal.

At step 36, controller 28 calculates an excitation phase delay value 68 based on the sampled counter and the peak of the sampled excitation signal. As shown in FIG. 3, the excitation phase delay value 68 is the difference between the beginning of the excitation square wave signal 60 and the peak of the sampled excitation signal 62. The beginning of the excitation square wave signal 60 is determined based on the sampled counter value. The peak of the sampled excitation signal 62 is determined based on a comparison of the sampled analog signals to find the largest value. The excitation phase delay value 68 represents the time delay between the start of the square wave signal 60 and the peak of the excitation signal 62. The excitation phase delay value 68 is subsequently employed by controller 28 to find the corresponding peak value (although it may be in phase or out of phase) of the secondary signals SINE and COSINE, shown in FIG. 4.

Figure 4:
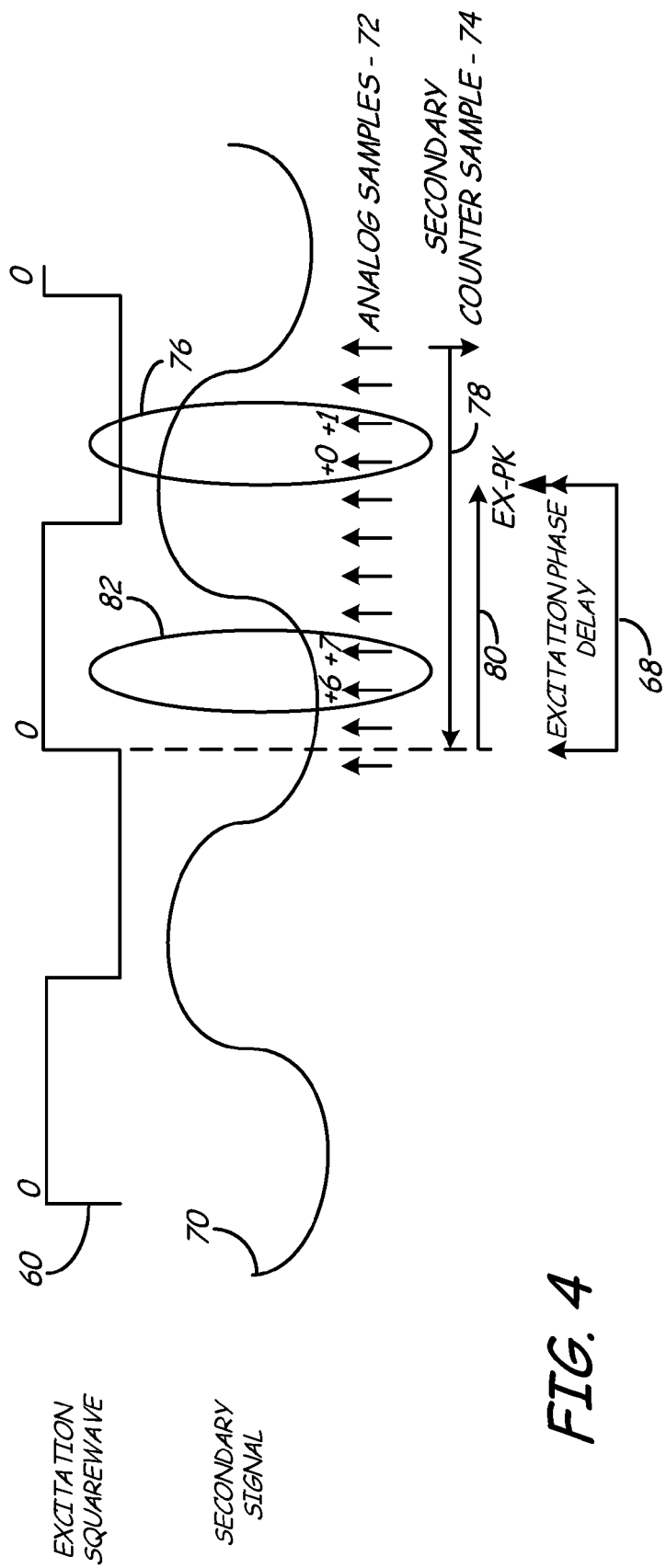
FIG. 4 is a waveform diagram that illustrates sampling of secondary signals based on the excitation phase delay according to an embodiment of the present invention.

Steps 38 through 46 are described with reference to FIG. 4, which illustrates for the sake of reference square wave signal 60, SINE signal 70, analog samples 72 of SINE signal 70, and secondary counter sample 74. The same operations discussed with respect to the SINE signal shown in FIG. 4 would be performed with respect to the COSINE signal to determine the sign of that signal.

At step 38, controller 28 monitors the SINE signal 70 corresponding with second secondary coil 20b. Once again, a full period of the SINE signal 70 is monitored. At step 40, controller 28 determines whether the last sample has been received yet. If not, sampling continues at step 38. When the last sample has been taken, then at step 42 the excitation counter 14 is sampled.

At step 44, based on the counter sample and the previously calculated excitation phase delay value, the expected peak 76 of sampled SINE signal 70 is located. The sampled counter value is utilized to count back to the beginning or start of the excitation square wave signal as indicated by line 78 in FIG. 4. The excitation phase delay value 68, previously calculated to represent the distance between the start of the square wave signal and the peak of the monitored excitation signal, is likewise added to the start of the excitation square wave signal to locate the likely peak of the sampled SINE signal 70. In other embodiments, other methods may be utilized to locate the portion of the sampled SINE signal that corresponds with the detected peak of the sampled excitation signal. However, because the sampled SINE signal may be either in phase or 180 degrees out of phase with the sampled excitation signal, locating the peak is not a matter of simply locating the largest value within the sampled waveform.

At step 46, the sampled peak 76 of the SINE signal is compared with samples 180° out of phase with sampled peak 76. In the embodiment shown in FIG. 3, because twelve samples are taken each period, selecting samples 180° out of phase requires moving forward or backward six samples. If the sampled peak 76 is greater than the out-of-phase sample 82, this indicates that SINE signal 70 is in-phase with excitation signal 62 (i.e., positive sign). If the sampled peak 76 is less than the out-of-phase samples 82, this indicates that secondary signal 70 is out-of-phase with excitation signal 62 (i.e., negative sign). In the embodiment shown in FIG. 4, a pair of samples (at times 0 and +1) located near the peak are averaged together, along with the samples located 180° from the peak (at times +6 and +7), and the averages are compared to one another. As the magnitudes of the monitored signals decrease, averaging the signals provides more accurate results.

At step 48, the process continues with respect to the other secondary signal (e.g., COSINE signal provided by secondary coil 20a), by monitoring the COSINE signal. In other embodiments, the COSINE signal may be monitored first, and the SINE signal subsequent to the COSINE signal. At step 50, controller 28 determines whether the last sample has been received, and continues sampling if it has not been received. At step 52, once all samples corresponding to a period of the COSINE signal have been received, the counter is sampled. At step 54, the peak of the COSINE signal is located based on the calculated excitation phase delay and the counter sample. At step 56, the sign of the COSINE signal is determined by comparing samples associated with the located peak with samples 180° out of phase with the detected peak.

The position of excitation coil 18 (i.e., of the resolver) can be divided into four quadrants, as illustrated in the table below. At step 58, the quadrant can be determined based on the sign of the monitored SINE and COSINE signals. Based on the determined quadrant, the resolver angle $\theta$ can be calculated according to the equations on the right.

| Quadrant | SINE signal | COSINE signal | Resolver Angle $\theta$ |
| --- | --- | --- | --- |
| First Quadrant | + | + | $\text{ARCTAN}\left(\frac{|\text{SIN}|}{|\text{COS}|}\right)$ |
| Second Quadrant | + | − | $180 - \text{ARCTAN}\left(\frac{|\text{SIN}|}{|\text{COS}|}\right)$ |
| Third Quadrant | − | − | $180 + \text{ARCTAN}\left(\frac{|\text{SIN}|}{|\text{COS}|}\right)$ |
| Fourth Quadrant | − | + | $360 - \text{ARCTAN}\left(\frac{|\text{SIN}|}{|\text{COS}|}\right)$ |

In this way, the present invention provides the ability to determine position of a resolver that is capable of positions greater than 90 degrees. In particular, the present invention is applicable to embodiments in which the excitation signal, and both the first and secondary signals are not sampled simultaneously, but rather are provided through a multiplexer that samples the signals one at a time.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A resolver comprising:
an excitation coil that receives an excitation signal;
a first secondary coil that generates a first signal in response to the excitation signal in the excitation coil;
a second secondary coil perpendicular to the first secondary coil, wherein the second secondary coil generates a second signal in response to the excitation signal in the excitation coil;
a sampling circuit comprising:
a multiplexer that samples at least one period of the excitation signal, the first signal, and the second signal, individually, each of the first and second signals sampled subsequent to the sampling of the excitation signal, and outputs a multiplexed analog signal based on the excitation signal, the first signal, and the second signal;
a filter that filters the multiplexed analog signal provided by the multiplexer and outputs a filtered multiplexed analog signal; and
an analog-to-digital converter that converts the filtered multiplexed analog signal to a digital signal; and
a controller configured to receive the digital signal from the analog-to-digital converter and to calculate a sign of the first signal and the second signal relative to the excitation signal, wherein the controller determines the sign of the first signal by comparing a determined peak of the sampled first signal to a sample of the first signal 180° out of phase with the determined peak of the sampled first signal, wherein if the determined peak is greater than the out of phase sample the sign is positive, wherein if the determined peak is less than the out of phase sample the sign is negative, and wherein based on the calculated sign of the first signal and the second signal the controller determines a quadrant of the excitation coil and based on the determined quadrant and magnitudes of the sampled first signal and second signal calculates a position of the excitation coil.

2. The resolver of claim 1, wherein the controller determines the sign of the second signal by comparing a determined peak of the sampled second signal to a sample of the second signal 180° out of phase with the determined peak of the sampled second signal, wherein if the determined peak is greater than the out of phase sample the sign is positive, wherein if the determined peak is less than the out of phase sample the sign is negative.

3. The resolver of claim 2, wherein the controller determines the excitation coil is in a first quadrant when the sign of the first and second signals is positive, a second quadrant when the sign of the first signal is positive and the second signal is negative, the third quadrant when the sign of the first signal and the second signal is negative, and the fourth quadrant when the sign of the first signal is negative and the sign of the second signal is positive.

4. A method of determining position of a resolver, the method comprising:
monitoring, by a multiplexer of a sampling circuit, an excitation signal provided to an excitation coil;
subsequently monitoring, by the multiplexer, a first signal generated in a first secondary coil in response to the excitation signal provided to the excitation coil;
subsequently monitoring, by the multiplexer, a second signal generated in a second secondary coil, perpendicular to the first secondary coil, in response to the excitation signal provided to the excitation coil;
outputting, by the multiplexer, a multiplexed analog signal based on the excitation signal, the first signal, and the second signal;
filtering, by a filter of the sampling circuit, the multiplexed analog signal provided by the multiplexer to determine a filtered multiplexed analog signal;
outputting, by the filter, the filtered multiplexed analog signal;
converting, by an analog-to-digital converter of the sampling circuit, the filtered multiplexed analog signal to a digital signal;
receiving, by a controller from the analog-to-digital converter, the digital signal;
determining, by the controller, a sign of the first signal with respect to the excitation signal, and a sign of the second signal with respect to the excitation signal, wherein the controller determines the sign of the first signal by locating a peak of the sampled first signal and comparing a located peak of the sampled first signal to a sample of the first signal 180° out of phase with the located peak of the sampled first signal, wherein if the located peak is greater than the out of phase sample the sign is positive, wherein if the located peak is less than the out of phase sample the sign is negative;
determining, by the controller, a quadrant of the resolver based on the determined sign of the first signal and the second signal; and
determining, by the controller, a position of the resolver based on monitored magnitude of the first signal and the second signal and the determined quadrant of the resolver.

5. The method of claim 4, wherein locating the peak of the sampled first signal includes:
calculating an excitation phase delay value based on a time difference between a start of a square wave signal used to generate the excitation signal and a peak of the excitation signal;
sampling an excitation counter during sampling of the first signal to determine the start of the square wave signal; and
applying the calculated excitation phase delay value to locate an expected peak of the sampled first signal.

6. The method of claim 5, wherein determining the sign of the second signal includes:
locating a peak of the second signal based on a peak of the excitation signal; and
comparing samples associated with the located peak of the second signal with samples 180° out of phase with the located peak, wherein if the located peak is greater than the out of phase samples then the sign is positive, wherein if the located peak is less than the out of phase samples then the sign is negative.

7. The method of claim 6, wherein locating the peak of the second signal includes:
calculating an excitation phase delay value based on a time difference between a start of a square wave signal used to generate the excitation signal and a peak of the excitation signal;

sampling an excitation counter during sampling of the second signal to determine the start of the square wave signal; and applying the calculated excitation phase delay value to locate an expected peak of the sampled second signal.

\* \* \* \* \*